(12) United States Patent
White et al.

(10) Patent No.: US 9,914,326 B2
(45) Date of Patent: Mar. 13, 2018

(54) MAIN SEAL FOR A HEAVY-DUTY VEHICLE WHEEL END ASSEMBLY

(71) Applicants: Hendrickson USA, L.L.C., Itasca, IL (US); Federal-Mogul Corporation, Southfield, MI (US)

(72) Inventors: Jay D. White, Massillon, OH (US); Jeffrey S. Morris, Stow, OH (US); Gerald A. Greca, Carleton, MI (US)

(73) Assignee: Hendrickson USA, L.L.C., Itasca, IL (US)

( * ) Notice: Subject to any disclaimer, the term of this patent is extended or adjusted under 35 U.S.C. 154(b) by 89 days.

(21) Appl. No.: 14/190,199

(22) Filed: Feb. 26, 2014

(65) Prior Publication Data

US 2014/0239597 A1 Aug. 28, 2014

Related U.S. Application Data

(60) Provisional application No. 61/769,974, filed on Feb. 27, 2013.

(51) Int. Cl.
*B60B 27/00* (2006.01)
*F16J 15/3256* (2016.01)
(Continued)

(52) U.S. Cl.
CPC ...... *B60B 27/0073* (2013.01); *F16C 33/7816* (2013.01); *F16C 33/7886* (2013.01);
(Continued)

(58) Field of Classification Search
CPC ...... F16J 15/3256; F16J 15/3264; F16J 15/54; F16J 15/3232; F16J 15/3456;
(Continued)

(56) References Cited

U.S. PATENT DOCUMENTS 4,432,557 A * 2/1984 Drucktenhengst ... F16J 15/3256
277/351
5,129,744 A * 7/1992 Otto ...................... B21B 31/078
277/351

(Continued)

FOREIGN PATENT DOCUMENTS

EP 0005706 A2 12/1979
EP 2469110 A1 6/2012
JP 2003-148627 A 5/2003

*Primary Examiner* — Eugene G Byrd
(74) *Attorney, Agent, or Firm* — Dureska & Moore, LLC; David P. Dureska; Greg Strugalski (57) ABSTRACT

A wheel end assembly for a heavy-duty vehicle includes an axle spindle and a hub rotatably mounted on the axle spindle. A main seal extends radially between the axle spindle and the hub. The seal includes a dynamic portion that seats in a bore formed in the wheel hub, and a static portion that seats on the axle spindle. The static portion includes a rigid carrier that in turn includes a first member, and a second member that is rigidly attached to the first member. An elastomer is bonded to the carrier member and forms a first external lip. The first external lip extends generally parallel to a chamfer formed in an inboard end of the hub. The first external lip, other external features, and internal features prevent contaminants from entering the wheel end assembly, retain lubricant in the assembly, and provide a dynamic expulsion surface to expel contaminants.

32 Claims, 4 Drawing Sheets

(51) Int. Cl.
   *F16C 33/78* (2006.01)
   *F16C 33/80* (2006.01)

(52) U.S. Cl.
   CPC ........... *F16C 33/80* (2013.01); *F16J 15/3256* (2013.01); *F16C 2326/02* (2013.01)

(58) Field of Classification Search
   CPC .............. B60B 27/0073; F16C 33/7816; F16C 33/7886; F16C 33/80; F16C 2326/02
   See application file for complete search history.

(56) References Cited

U.S. PATENT DOCUMENTS

| | | | | |
|---|---|---|---|---|
| 5,149,207 A * | 9/1992 | Vignoito | ............... | F16C 19/184 277/377 |
| 5,183,269 A * | 2/1993 | Black | ................... | F16J 15/3256 277/349 |
| 5,201,529 A * | 4/1993 | Heinzen | ............... | F16J 15/3256 277/351 |
| 5,269,536 A * | 12/1993 | Matsushima | ........ | F16J 15/3256 277/349 |
| 5,611,548 A * | 3/1997 | Dahlhaus | ............... | F16J 15/326 277/317 |
| 5,649,710 A * | 7/1997 | Kanda | .................. | F16J 15/3256 277/371 |
| 6,050,570 A * | 4/2000 | Otto | .................... | F16C 33/7883 277/351 |
| 6,170,834 B1 * | 1/2001 | Vogt | ...................... | F16J 15/324 277/559 |
| 7,594,664 B2 | 9/2009 | Maskaliunas | | |
| 7,909,333 B2 | 3/2011 | Greca | | |
| 8,141,882 B2 | 3/2012 | Wang et al. | | |
| 8,342,535 B2 | 1/2013 | Lattime et al. | | |
| 8,628,248 B2 * | 1/2014 | Walter | ................ | F16C 33/7863 384/477 |
| 2002/0011710 A1* | 1/2002 | Oldenburg | ........... | F16J 15/3256 277/612 |
| 2003/0184021 A1* | 10/2003 | Hatch | .................... | F16J 15/3264 277/395 |
| 2004/0227303 A1* | 11/2004 | Bock | .................... | F16J 15/3256 277/549 |
| 2007/0290451 A1* | 12/2007 | Yager | .................. | F16J 15/3256 277/551 |
| 2008/0128997 A1* | 6/2008 | Berdichevsky | ...... | F16J 15/3264 277/366 |
| 2010/0270751 A1 | 10/2010 | Loe et al. | | |

\* cited by examiner

MAIN SEAL FOR A HEAVY-DUTY VEHICLE WHEEL END ASSEMBLY

CROSS-REFERENCE TO RELATED APPLICATIONS

This application claims the benefit of U.S. Provisional Patent Application Ser. No. 61/769,974, which was filed on Feb. 27, 2013.

BACKGROUND OF THE INVENTION

Technical Field

The invention relates to wheel end assemblies, and in particular to wheel end assemblies for heavy-duty vehicles, such as tractor-trailers. More particularly, the invention is directed to a main seal or hub seal for a heavy-duty vehicle wheel end assembly that extends radially between a hub of the wheel end assembly and an axle spindle, which prevents contaminants from entering the wheel end assembly and retains lubricant in the wheel end assembly. Still more particularly, the invention relates to a main seal for a heavy-duty vehicle wheel end assembly that includes external features and internal features that optimize the prevention of contaminants from entering the wheel end assembly and retain lubricant in the wheel end assembly, and provide a dynamic expulsion surface to expel any contaminants, while including minimal drag in order to preserve the life of the seal and optimize vehicle fuel efficiency.

Background Art

For many years, the heavy-duty vehicle industry has utilized wheel end assemblies which typically are mounted on each end of one or more non-drive axles. Each wheel end assembly typically includes a hub rotatably mounted on a bearing assembly that in turn is immovably mounted on the outboard end of the axle, commonly known as an axle spindle. As is well known to those skilled in the art, for normal operation of the wheel end assembly to occur, the bearing assembly and surrounding components must be lubricated with grease or oil. Therefore, the wheel end assembly must be sealed to prevent leakage of the lubricant, and also to prevent contaminants from entering the assembly, both of which could be detrimental to its performance. More specifically, a hubcap is mounted on an outboard end of the wheel hub, and a main seal or hub seal is rotatably mounted on an inboard end of the hub and the bearing assembly in abutment with the axle spindle, resulting in a closed or sealed wheel end assembly.

While most wheel end assemblies include these general features, the design and arrangement of the hub, bearing assembly, hubcap, main seal, and other components, as well as the axle spindle, vary according to the specific vehicle design and its anticipated uses. For example, main seals of the prior art have included non-contact types and contact types. More particularly, because the wheel hub is a dynamic component that rotates about the static axle spindle, the main seal bridges the gap between a dynamic environment and a static environment. As a result, in addition to retaining lubricant in the wheel end assembly and preventing contaminants from entering the wheel end assembly, it is desirable for a main seal to include minimal drag or friction between its internal components, thereby preserving the life of the seal and also increasing the fuel efficiency of the vehicle.

In order to reduce drag, non-contact seals were developed in the prior art. Non-contact seals include internal components that do not contact one another, and employ projections and specific geometric configurations to retain lubricant in the wheel end assembly and prevent contaminants from entering the wheel end assembly. However, while often desirably reducing drag, the non-contact nature of the components of such seals have not optimized the prevention of contaminants entering the wheel end assembly, at times resulting in the possibility of reduced life of the wheel end assembly.

In order to increase the ability of a main seal to prevent contaminants from entering a wheel end assembly, contact-type seals have been employed, which include internal components that contact one another to provide enhanced sealing characteristics. However, while generally providing improved exclusion of contaminants when compared to non-contact seals, prior art contact-type seals lack enhanced combinations of contaminant-exclusion features. Without such combinations of features to decrease the amount of contaminants that enter the structure of the seal, contaminants may eventually build up and bypass the contact components in the seal, thus contaminating the wheel end assembly and reducing its life.

As a result, there is a need in the art to develop a main seal for a heavy-duty wheel end assembly that provides features having increased contaminant exclusion, while retaining lubricant in the wheel end assembly and including minimal drag to preserve the life of the seal and optimize fuel efficiency. The main seal for a heavy-duty vehicle wheel end assembly of the present invention satisfies this need.

BRIEF SUMMARY OF THE INVENTION

An objective of the present invention is to provide a main seal for a heavy-duty wheel end assembly that provides features having increased contaminant exclusion.

Another objective of the present invention is to provide a main seal for a heavy-duty wheel end assembly that retains lubricant in the wheel end assembly.

Still another objective of the present invention is to provide a main seal for a heavy-duty wheel end assembly that includes minimal drag to preserve the life of the seal and optimize fuel efficiency.

This objective and others are obtained by the main seal for a heavy-duty vehicle wheel end assembly of the present invention. In an exemplary embodiment of the invention, a main seal for a heavy-duty vehicle wheel end assembly is provided. The wheel end assembly includes an axle spindle and a hub rotatably mounted on the axle spindle. The main seal extends radially between the axle spindle and the hub, and includes a dynamic portion seating in a bore fondled in the wheel hub and a static portion seating on the axle spindle. The static portion includes a rigid carrier. An elastomer is bonded to the carrier and forms a first external lip. The first external lip extends generally parallel to a chamfer formed in an inboard end of the hub, and the first external lip generally prevents contaminants from entering the wheel end assembly.

BRIEF DESCRIPTION OF THE SEVERAL VIEWS OF THE DRAWINGS

The preferred embodiment of the invention, illustrative of the best mode in which Applicants have contemplated applying the principles of the invention, is set forth in the following description and is shown in the drawings, and is particularly and distinctly pointed out and set forth in the appended claims.

Similar numerals refer to similar parts throughout the drawings.

DETAILED DESCRIPTION OF THE INVENTION

Figure 1:
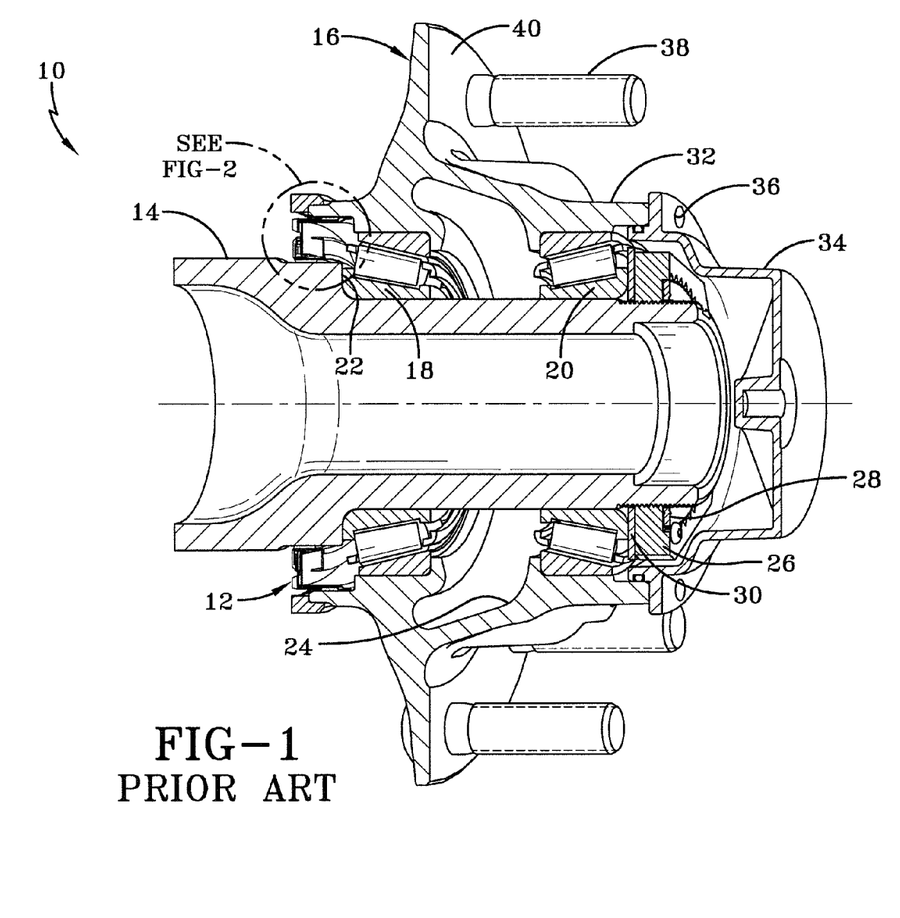
FIG. 1 is a fragmentary cross-sectional perspective view of a heavy-duty vehicle axle spindle and wheel end assembly, including a prior art main seal.

Turning to FIG. 1, in order to better understand the main seal of the present invention and the environment in which it operates, an axle spindle and wheel end assembly, indicated generally at 10, is shown with a prior art main seal or hub seal 12. An axle depends from and extends transversely across the trailer of a heavy-duty tractor-trailer (not shown). More specifically, and as is known in the art, the axle includes a central tube having a pair of ends (not shown) and a pair of axle spindles 14, with each one of the axle spindles being integrally connected by any suitable means, such as welding, to a respective one of the ends of the central tube, so that the axle is comprised of the central tube and a pair of axle spindles. A typical heavy-duty tractor-trailer includes one or more non-drive axles suspended from the trailer, with each of the axles having a wheel end assembly 16 mounted on each end of the axle. For the sake of clarity, only one axle end and wheel end assembly 16 will be described herein.

Wheel end assembly 16 includes a bearing assembly having an inboard bearing 18 and an outboard bearing 20 that are immovably mounted on the outboard end of axle spindle 14. More particularly, inboard bearing 18 is mounted on the outer diameter of axle spindle 14 with its inboard surface in abutment with a shoulder 22 formed in the axle spindle. A cavity 24 is formed between inboard and outboard bearings 18, 20 and a short, straight bearing spacer (not shown) optionally is disposed between the bearings in the cavity to maintain spacing between the bearings. A nut 26 threadably engages the outboard end of axle spindle 14, and via an outer washer 28 and an optional inner washer 30, secures bearings 18, 20 and any bearing spacer in place. Nut 26 is more fully described in U.S. Pat. No. 8,016,531, which is owned by one of the assignees of the present invention, Hendrickson USA, L.L.C.

A wheel hub 32 is rotatably mounted on inboard and outboard bearings 18, 20 in a manner well known to those skilled in the art. A hubcap 34 is mounted on the outboard end of hub 32 by a plurality of bolts (not shown) that each pass through a respective one of a plurality of openings 36 formed in the hubcap, and threadably engage a respective one of a plurality of aligned threaded openings (not shown) formed in the hub. In this manner, hubcap 34 closes the outboard end of wheel end assembly 16. Hubcap 34 is more fully described in U.S. Pat. No. 7,731,300, which is owned by one of the assignees of the present invention, Hendrickson USA, L.L.C.

Prior art main seal 12 is a continuous seal that is rotatably mounted on the inboard end of wheel end assembly 16 and closes the inboard end of the assembly. More particularly, hub seal 12 is mounted on wheel end assembly 16 to radially bridge hub 32 and axle spindle 14 to seal cavity 24. In order to maintain proper lubrication and operation of inboard and outboard bearings 18, 20, a suitable amount of lubricant (not shown) is introduced into cavity 24. A plurality of interference fit studs 38 are used to mount a brake drum, tire rim and tire (not shown) against a mounting face 40 of hub 32 and thus on wheel end assembly 16. For the purpose of completeness, an anti-lock braking system (ABS) tone ring 42 (FIG. 2) is shown mounted on hub 32 as known in the art.

Figure 2:
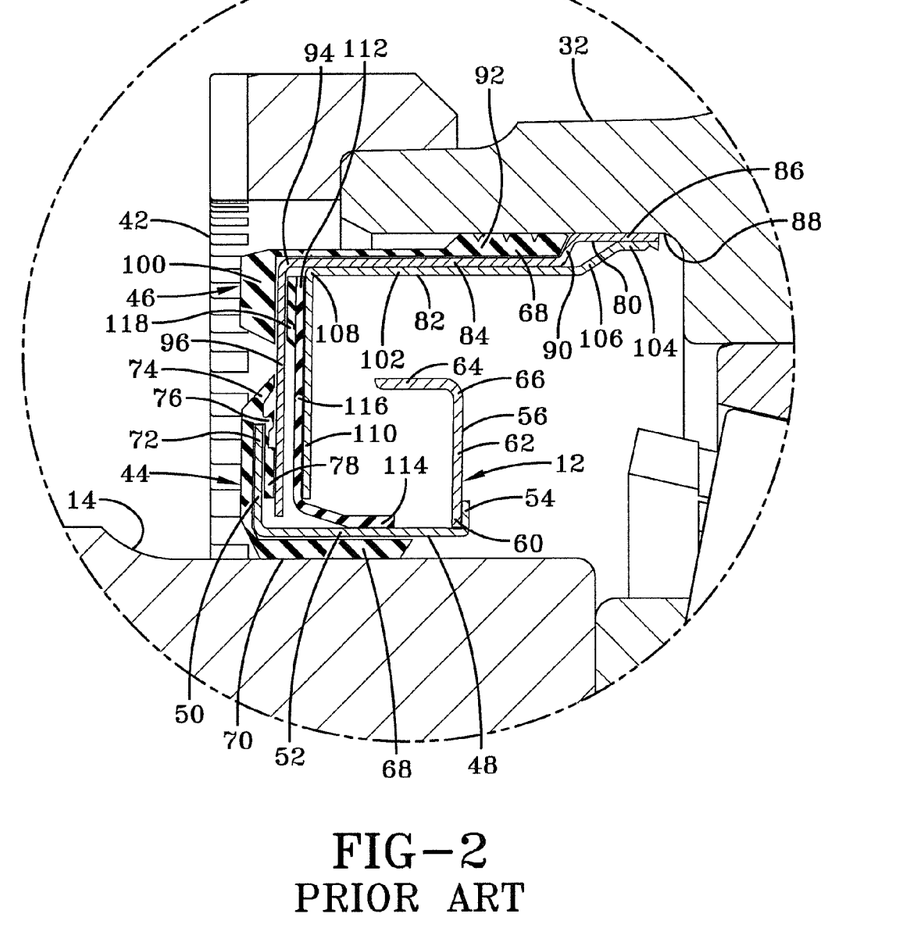
FIG. 2 is an enlarged fragmentary cross-sectional view of the circled area in FIG. 1.

With reference now to FIG. 2, the structure of first prior art hub seal 12 includes a radially inward or static portion 44 and a radially outward or dynamic portion 46. Static portion 44 includes a C-shaped carrier member 48 preferably formed of metal. C-shaped member 48 includes a radially-extending inboard wall 50, an axially-extending wall 52 which extends outboardly from the radially-extending inboard wall, and which terminates at a short radially-extending outboard wall 54.

Static portion 44 also includes an L-shaped member 56, which is rigidly attached to the inboard surface of radially-extending outboard wall 54 of C-shaped member 48. More particularly, a radially inward end 60 of a radially-extending wall 62 of L-shaped member 56 is attached to the inboard surface of radially-extending outboard wall 54 of C-shaped member 48 by crimping or other mechanical-force attachment means known to those skilled in the art. L-shaped member 56 also includes an axially-extending wall 64, which extends axially inboardly from a radially outward end 66 of radially-extending wall 62 of the L-shaped member. L-shaped member 56 protects a sealing lip 116, to be described in greater detail below, during assembly of axle spindle and wheel end assembly 10.

To provide sealing characteristics, an elastomer or polymer 68, such as nitrile rubber (NBR), is bonded as known in the art to C-shaped member 48. Elastomer 68 is bonded to the radially inward surface of axially-extending wall 52 of C-shaped member 48 to form an axle interface 70. Elastomer 68 extends along the inboard surface of radially-extending inboard wall 50. At radially outward end 72 of inboard wall 50, elastomer 68 forms a first lip 74 that extends outboardly from, and is angled radially outwardly from, the inboard wall. Elastomer 68 continues to the outboard surface of inboard wall 50 and forms a second lip 76, and along the outboard surface of the inboard wall to form an area with increased thickness 78. First lip 74, second lip 76, and thick area 78 are static structures that are disposed adjacent the inboard surface of dynamic portion 46 to deter contaminants from entering seal 12.

Dynamic portion 46 includes a carrier comprised of radially outward member 80 and a radially inward member 82, each one of which is preferably formed of metal and is a generally L-shaped axially-extending member. Outward member 80 includes an axially-extending wall 84 that includes an outboard end 86 which contacts a bore 88 formed in hub 32, and as the wall extends inboardly, includes an S-shaped bend 90 to accommodate an elastomer interface 92 with the hub. At an inboard end 94 of axially-extending wall 84, outward member 80 also includes a radially-inwardly extending wall 96. Radially-inwardly extending wall 96 is disposed adjacent first lip 74, second lip 76, and thick area 78 of static portion 44 to deter contaminants from entering seal 12.

To provide sealing characteristics, elastomer or polymer 68 is bonded as known in the art to outward L-shaped member 80. More particularly, elastomer 68 is bonded to the radially outward surface of axially-extending wall 84 inboardly of S-shaped bend 90 to form hub interface 92.

Elastomer 68 continues to the inboard surface of radially-inwardly extending wall 96 to form a thick inboard area 100.

Generally L-shaped axially-extending radially inward member 82 of dynamic portion 46 includes an axially-extending wall 102 that includes an outboard end 104 which connects to the radially inward surface of outboard end 86 of axially-extending wall 84 of outward member 80. As axially-extending wall 102 of radially inward member 82 extends inboardly, it is formed with an angled S-shaped bend 106 to enable continued contact with axially-extending wall 84 of outward member 80. At an inboard end 108 of axially-extending wall 102, inward member 82 also includes a radially-inwardly extending wall 110, which is disposed outboardly of and extends in a spaced parallel manner relative to radially-inwardly extending wall 96 of outward member 80.

Radially outward member 80 and radially inward member 82 clamp and thus secure the position of sealing lip 116 in dynamic portion 46 of hub seal 12. More particularly, sealing lip 116 includes a radially outward end 112 and a radially inward end 114, and typically is formed of a polymer having a low coefficient of friction, such as Polytetrafluoroethylene (PTFE). Radially outward end 112 of sealing lip 116 is disposed adjacent an elastomer pad 118, and the outward end of the lip and the pad are compressed between wall 96 of outward member 80 and wall 110 of inward member 82. As it extends past the end of wall 110 of inward member 82, sealing lip 116 contacts axial wall 52 of C-shaped member 48, which causes radially inward end 114 of the sealing lip to bend in an axially outboard direction. The contact of inward end 114 of dynamic sealing lip 116 on a radially outward surface of wall 52 of C-shaped member 48 retains lubricant in hub cavity 24 (FIG. 1), and in cooperation with first lip 74, second lip 76, and thick area 78 of static portion 44, deters contaminants from entering seal 12. As described above, L-shaped member 56 of static portion 44 partially surrounds and thus protects the integrity of sealing lip 116 during assembly of axle spindle and wheel end assembly 10.

While prior art seal 12 provides improved exclusion of contaminants over non-contact seals, it lacks an enhanced combination of contaminant exclusion features. Without such features to optimally minimize the amount of contaminants that enter the structure of seal 12, enough contaminants may eventually build up to enable them to bypass first lip 74, second lip 76, thick area 78 of static portion 44, and sealing lip 116 to contaminate wheel end assembly 16. This disadvantage of prior art seal 12 establishes a need to develop a main seal for a heavy-duty wheel end assembly that provides features having increased contaminant exclusion, while retaining lubricant in the wheel end assembly and exhibiting minimal drag to preserve the life of the seal and optimize fuel efficiency. The hub seal for a heavy-duty vehicle wheel end assembly of the present invention satisfies this need, as will now be described.

Figure 3:
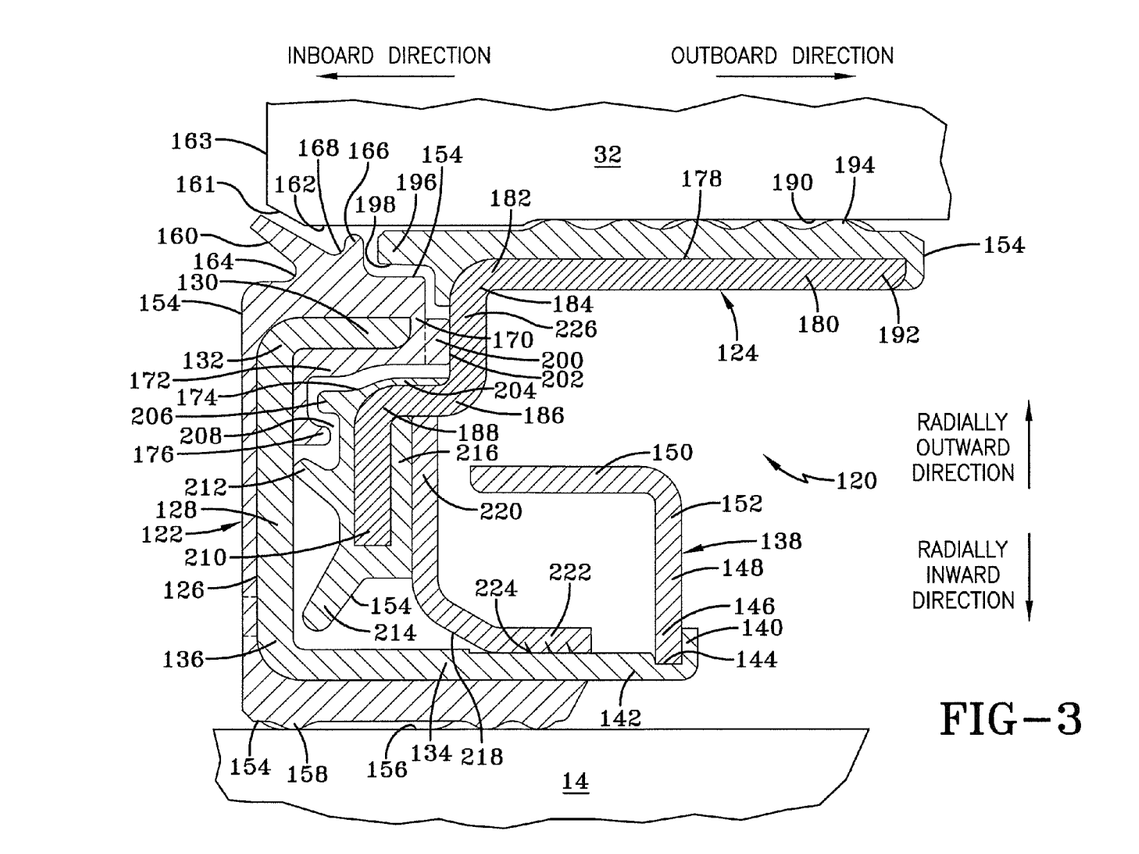
FIG. 3 is a cross-sectional view of an exemplary embodiment of the main seal of the present invention, shown installed on a fragmentary view of a heavy-duty vehicle axle spindle and wheel end assembly.

With reference now to FIG. 3, an exemplary embodiment of a main seal for a heavy-duty vehicle wheel end assembly of the present invention is shown and indicated generally at 120. Main seal 120 of the invention is a contact-type seal that employs partial contact of its internal components to minimize drag with hub 32. Main seal 120 includes a radially inward or static portion 122 and a radially outward or dynamic portion 124.

Static portion 122 includes a first carrier member 126 that is generally C-shaped, and preferably is formed of a rigid material, such as metal. C-shaped member 126 includes a radially-extending wall 128, an axially-extending outward wall 130 that extends outboardly from an outward end 132 of the radially-extending wall, and an axially-extending inward wall 134, which extends outboardly from an inward end 136 of the radially-extending wall and is generally parallel to and spaced apart from the axially-extending outward wall.

Static portion 122 also includes a second carrier member 138 that is generally L-shaped, is preferably formed of a rigid material such as metal, and which is rigidly attached to C-shaped member 126. More particularly, an axially-extending lip 140 is formed at an outboard end 142 of inward wall 134 of C-shaped member 126, and a feature such as a notch 144 is formed in the inward wall adjacent the lip. A radially inward end 146 of a radially-extending wall 148 of L-shaped member seats in notch 144 and against lip 140, and the inward end of the wall is connected to the lip and to axially-extending wall 134 by crimping or other mechanical-force means known to those skilled in the art. L-shaped member 138 also includes an axially-extending wall 150, which extends axially inboardly from a radially outward end 152 of radially-extending wall 148. L-shaped member 138 partially surrounds and thus protects a sealing lip 218, to be described in greater detail below, during assembly of axle spindle and wheel end assembly 10.

To provide sealing characteristics and a dynamic expulsion surface, as will be described in detail below, an elastomer or polymer 154, such as nitrile rubber (NBR) or other suitable elastomeric or polymeric compound, which shall be referred to herein as an elastomer for the purpose of convenience, is bonded as known in the art to C-shaped member 126. Elastomer 154 is bonded to the radially inward surface of axially-extending inward wall 134 of C-shaped member 126 to form an axle interface 156. Elastomer 154 preferably is formed with features such as protrusions 158 to enable a press fit on axle spindle 14 without deforming seal 120. Elastomer 154 extends along the inboard surface of radially-extending wall 128 of C-shaped member 126 to seal and thus protect the surface of the inboard wall from contaminants, which in turn deters corrosion of the wall.

At the radially outward surface of axially-extending outward wall 130, elastomer 154 forms a first external lip 160. First external lip 160 extends radially outwardly from axially-extending outward wall 130 and is angled inboardly in a manner that is generally parallel to a chamfer 161 formed adjacent a bore 162 formed in an inboard end 163 of hub 32. Preferably, chamfer 161 is formed at an angle of about 30 degrees from the longitudinal centerline of axle spindle 14, and a slight gap exists between lip 160 and chamfer 161 so that the lip does not drag against hub 32. Due to the rotational motion of hub 32, first external lip 160 and hub chamfer 161 cooperate to form an external, non-contact labyrinth that acts to divert water and other contaminants radially outwardly and thus away from main seal 120. A concave surface 164 is formed radially inwardly of first external lip 160, which enables the lip to be flexible, which is desirable due to the proximity of the lip to rotating hub 32.

Elastomer 154 forms a second external lip 166 outboardly of and adjacent first lip 160. Second lip 166 extends generally radially outwardly from axially-extending outward wall 130 and does not contact hub 32, again thereby reducing drag of main seal 120 against the hub, but is in close proximity to hub bore 162. The outward radial orientation of second lip 166 and its close proximity to hub bore 162 enables the second lip to continue the external, non-contact labyrinth, and act as an additional external barrier that prevents contaminants, which may bypass first lip 160, from entering main seal 120. During vehicle operation, first and second lips 160, 166, respectively, act as a system to create a capillary sealing element that uses hub 32 at bore 162 as a close-proximity sealing surface, as the first and second lips are stationary and the hub rotates about these seal elements.

A channel 168 is formed between first lip 160 and second lip 166. During vehicle operation, the proximity of channel 168 to rotating hub 32 cooperates with the outward radial extension and inboard angle of first lip 160 to encourage water and other contaminants to travel inboardly and be "spun off" and away from main seal 120. In addition, when the vehicle stops, channel 168 acts as a drip channel, enabling water that may be contained between first lip 160 and second lip 166 to travel about the channel toward the ground, dripping out and away from main seal 120 between the first lip and hub 32 by the force of gravity.

Elastomer 154 continues along the radially outward surface of axially-extending outward wall 130 and around the outboard end of the wall, forming an outboard portion 170 that includes a plurality of annularly-arranged protrusions or bumpers 200. More specifically, bumpers 200 are a series of spaced-apart, outboardly-extending features that cooperate with dynamic seal portion 124, as will be described below. Elastomer 154 then continues to the radially inward surface of axially-extending outward wall 130 of C-shaped member 126 to form a curved profile 172 that in turn cooperates with mating features formed on dynamic seal portion 124 to form an internal labyrinth 174, as will also be described below. Elastomer 154 on static portion 122 continues along the outboard surface of radially-extending wall 128 of C-shaped member 126 to terminate in an axially outboardly-extending protrusion 176, which cooperates with a mating feature formed on dynamic seal portion 124, as will be described below.

Dynamic portion 124 of main seal 120 includes a single generally axially-extending carrier member 178 that is preferably formed of a rigid material, such as metal. Carrier member 178 in turn includes an axially-extending wall 180, which includes a first bend 184, a second bend 186, and a third bend 188 formed adjacent an inboard portion 182 to create a serpentine-like shape. Bends 184, 186, and 188 increase the structural integrity of main seal 120 and provide areas for sealing features to be formed. As will be described in detail below, to provide sealing characteristics and a dynamic expulsion surface, elastomer or polymer 154 is bonded as known in the art to portions of carrier member 178.

More particularly, elastomer 154 is bonded as known in the art to an outboard end 192 and a radially outward surface of axially-extending wall 180 to form a hub interface 190. Elastomer 154 preferably is formed with features such as protrusions 194 to enable a secure fit in hub bore 162 without deforming seal 120. At first bend 184, elastomer 154 forms axially inboardly-extending dynamic protrusion 196, which cooperates with second external lip 166 to form an external channel 198.

Elastomer 154 continues just past first bend 184 along the radial outward and axially inboard surfaces of wall 180 and then terminates, thereby providing a section 226 of the wall between first and second bends 184 and 186, respectively, which directly contacts annular bumpers 200 of static seal portion 122. The contact of bumpers 200 and wall section 226 forms a dam 202, which is a contact area between static seal portion 122 and dynamic seal portion 124 with a minimal surface area. More particularly, annular bumpers 200 are spaced apart and thus include spaces or gaps (not shown) between them, which reduces the contact between the bumpers and wall section 226. In this manner, dam 202 restricts the ingress of contaminants into seal 120 that may pass by first and second external lips 160, 166, respectively, and dynamic protrusion 196, while creating minimal drag within the seal.

Elastomer 154 re-commences at second bend 186, and continues along the radial outward and axially inboard surfaces of wall 180 to form a curved profile 204 between the second bend and third bend 188, which cooperates with curved profile 172 of static portion 122 to form internal labyrinth 174. Labyrinth 174 is a thin capillary area that follows the contour of the curved features of dynamic or rotating portion 124 of main seal 120 to form a portion of a dynamic expulsion surface that traps and dynamically pushes contaminants radially outward and away from bearings 18, 20 and cavity 24 (FIG. 1), as will be described in greater detail below.

At third bend 188, elastomer 154 forms axially inboardly-extending protrusion 206, which cooperates with outboardly-extending protrusion 176 of static portion 122. Inboardly-extending protrusion 206 and outboardly-extending protrusion 176 are non-contacting, overlapping protrusions that do not create drag, while forming an obstructed path 208 for a contaminant that may bypass first lip 160, second lip 166, dynamic protrusion 196, dam 202, and labyrinth 174 which is difficult to traverse.

After third bend 188, wall 180 includes a radially inwardly-extending terminal end 210. Adjacent terminal end 210 of wall 180, elastomer 154 forms a first internal lip 212 that extends radially outwardly and is angled inboardly from the wall, lightly contacting the outboard surface of radially-extending wall 128 of C-shaped member 126. First internal lip 212 thus does not impart significant drag, while providing an additional barrier to prevent a contaminant that may bypass first lip 160, second lip 166, dynamic protrusion 196, dam 202, labyrinth 174, and obstructed path 208, from entering bearings 18, 20 and cavity 24. Radially inwardly of first internal lip 212, elastomer 154 forms a second internal lip 214, which extends radially inwardly and is angled inboardly from wall 180. Second internal lip 214 does not contact C-shaped member 126, thereby creating no drag, while providing an additional barrier against contaminants from passing through main seal 120.

Elastomer 154 continues around terminal end 210 of wall 180, extending along the outboard surface of the wall from the terminal end of the wall to the outboard surface of third bend 188. Adjacent a terminal portion 216 of elastomer 154, a curved dynamic sealing lip 218 extends radially inwardly from wall 180 between second and third bends 186, 188. Sealing lip 218 includes a radially outward end 220 that is bonded to the outboard surface of terminal portion 216 of elastomer 154 by means known in the art. As it extends radially inwardly, sealing lip contacts the radially outward surface of axially-extending inward wall 134 of C-shaped member 126, which causes a radially inward end 222 of the sealing lip to bend in an outboard direction. With this structure, inward end 222 of sealing lip 218 rides against axially-extending inward wall 134 to faint a primary seal from ingress of contaminants and to retain lubricant in wheel end assembly 16 (FIG. 1). In order to minimize drag, sealing lip 218 preferably is formed of a polymer having a low coefficient of friction, such as Polytetrafluoroethylene (PTFE). In addition, sealing lip 218 may be formed with features such as notches or slits 224 to improve the ability of the lip to seal and retain lubricant in wheel end assembly 16.

Figure 4:
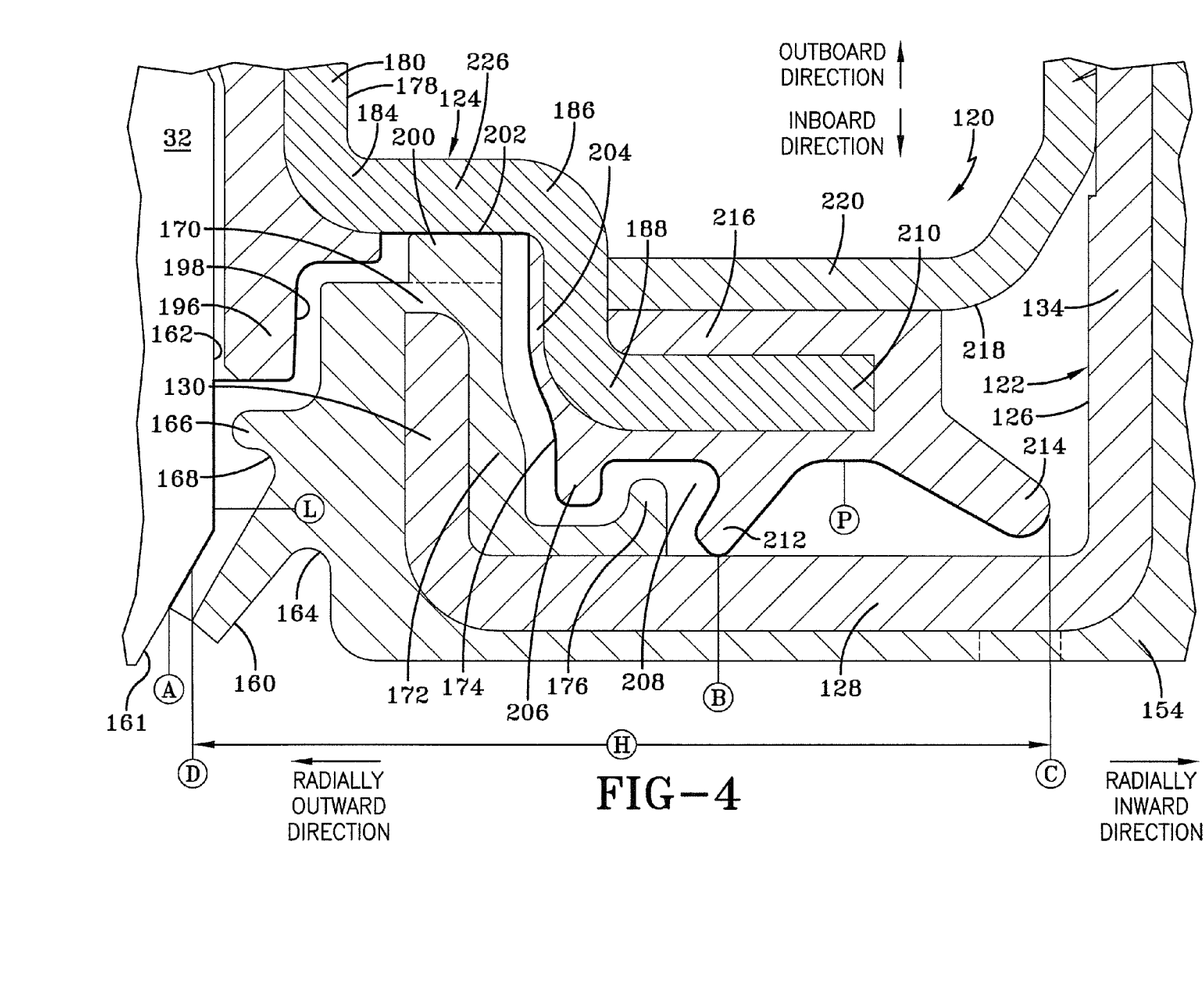
FIG. 4 is an enlarged cross-sectional view of the exemplary embodiment of the main seal of the present invention shown in FIG. 3.

Turning now to FIG. 4, aspects of the dynamic expulsion surface of main seal 120 of the present invention are illustrated. More particularly, in the event that a contaminant makes it past first lip 160, second lip 166, dynamic protrusion 196, dam 202, labyrinth 174, and obstructed path 208, certain features of main seal 120 form a dynamic expulsion surface to move or pump the contaminant out of the seal during vehicle operation. The dynamic expulsion surface includes a capillary surface indicated by L, which cooperates with a transmission or pumping surface indicated by P.

Capillary surface L extends radially inwardly from point A, which is the point on hub chamfer 161 that is adjacent point D, which is the radially outward and axially inboard point of first external lip 160, to point B. Point B is the area of contact of first internal lip 212 with radial wall 128 of C-shaped member 126. Capillary surface L is formed by the close-proximity features of obstructed path 208, labyrinth 174, dam 202, external channel 198, and hub bore 162 in relation to second external lip 166, channel 168, and first external lip 160. Capillary surface L is a thin capillary area that has a radial section which traps contaminants, and as hub 32 rotates during vehicle operation, dynamically moves or pushes contaminates radially outwardly. Once the contaminants move radially outwardly to hub bore 162, dynamic force moves them inboardly along the hub bore and hub chamfer 161 past first external lip 160, and thus away from bearings 18, 20 and cavity 24 (FIG. 1). Preferably, a light preload on bearings 18, 20 is employed as known in the art, which limits axial movement of hub 32 during vehicle operation, in turn maintaining the close proximity of the features that form capillary surface L to optimize the performance of the capillary surface.

Pumping surface P extends from point C, which is the radially inward and axially inboard point of second internal lip 214, radially outwardly to point B. In the event that a contaminant reaches point C, the configuration of pumping surface P formed by first and second internal lips 212, 214 transmits or pumps the contaminant radially outwardly toward capillary surface L as a result of rotation of hub 32 during vehicle operation.

It has been discovered that certain relationships between aspects of main seal 120 optimize the effectiveness of the dynamic expulsion surface, which is expressed as L+P. For example, the length of capillary surface L to radial height H, which extends from point C to point D of main seal 120, optimizes the effectiveness of the dynamic expulsion surface. For example, it is preferable for a main seal 120 that includes a radial height H from point C to point D of about 14.56 millimeters (mm) to have a length of capillary surface L of about 21.20 mm. When this relationship is expressed as a ratio of the length of capillary surface L to radial seal height H from point C to point D, the value is about 1.46. In order to provide effective contaminant restriction, and effective expulsion of contaminants, the ratio of the length of capillary surface L to radial seal height H from point C to point D preferably is greater than about 1.20.

Another relationship that optimizes the effectiveness of the dynamic expulsion surface is the length of the dynamic expulsion surface to radial seal height H. For example, it is preferable for a main seal 120 that includes a radial height H from point C to point D of about 14.56 mm, to have a total length of the dynamic expulsion surface, that is, the length of capillary surface L and pumping surface P, of about 28.13 mm. When this relationship is expressed as a ratio of the length of the dynamic expulsion surface (L+P) to radial seal height H, the value is about 1.93. This value indicates that the dynamic expulsion surface provides about 93 percent more surface when compared to straight radial height H from point C to point D of main seal 120. In order to provide effective contaminant restriction, and effective expulsion of contaminants, the ratio of the length of the dynamic expulsion surface (L+P) to radial seal height H from point C to point D preferably is greater than about 1.50.

A further relationship that optimizes the effectiveness of the dynamic expulsion surface is the total length of the dynamic expulsion surface (L+P) to the "envelope" distance of main seal 120, or the total radial seal length, that is, the distance from point D to spindle interface 156 (FIG. 3). For example, it is preferable for a main seal 120 that includes an envelope distance from point D to spindle interface 156 of about 17.82 mm to have a length of the dynamic expulsion surface (L+P) of about 28.13 mm. When this relationship is expressed as a ratio of the length of the dynamic expulsion surface (L+P) to envelope distance (D to 156), the value is about 1.58. In order to provide effective contaminant restriction, and effective expulsion of contaminants, the ratio of the length of the dynamic expulsion surface (L+P) to envelope distance (D to 156) preferably is greater than about 1.20.

An additional feature of main seal 120 that optimizes the effectiveness of the seal in resisting the ingress of contaminants is the number of bends in the seal that are between zero (0) and ninety (90) degrees. More particularly, an angle that is between zero and ninety degrees is more likely to resist ingress of contaminants than an angle that is greater than ninety degrees. Main seal 120 includes at least twelve (12) bends that are between zero and ninety degrees between point A, which is the point on hub chamfer 161 that is adjacent the radially outward and axially inboard point of first external lip 160, and point B, which is the area of contact of first internal lip 212 with radial wall 128 of C-shaped member 126. Preferably, as shown in the above-described construction and features, main seal 120 provides about sixteen (16) bends that are between zero and ninety degrees between point A and point B. By providing such a significant number of bends between zero and ninety degrees, main seal 120 thereby desirably provides optimal contaminant exclusion.

In this manner, main seal 120 for a heavy-duty vehicle wheel end assembly of the present invention provides an enhanced combination of external features and internal features that optimize the prevention of contaminants from entering wheel end assembly 16 and retain lubricant in the wheel end assembly, and provide a dynamic expulsion surface to expel contaminants, while including minimal drag in order to preserve the life of the seal and optimize vehicle fuel efficiency.

The external features of main seal 120 that optimize the prevention of contaminants from entering wheel end assembly 16 include first external lip 160, which cooperates with hub chamfer 161 to form a non-contact labyrinth that acts to divert water and other contaminants radially outwardly and thus away from the seal. This labyrinth is continued by second lip 166 and dynamic protrusion 196, which act as an additional external barrier that prevents contaminants, which may bypass first lip 160, from entering main seal 120. In addition, during vehicle operation, first and second lips 160, 166, respectively, act as a system to create a capillary sealing element that uses hub 32 at bore 162 as a close-proximity sealing surface.

Moreover, during vehicle operation, the proximity of channel 168 to rotating hub 32 cooperates with the outward radial extension and inboard angle of first lip 160 to encourage water and other contaminants to travel inboardly and be "spun off" and away from main seal 120. In addition, channel 168 acts as a drip channel when the vehicle is stationary, enabling water that may be contained between first lip 160 and second lip 166 to travel about the channel and out of main seal 120 toward the ground.

The internal features of main seal 120 that optimize the prevention of contaminants from entering wheel end assembly 16 include dam 202, which impedes the ingress of contaminants into the seal that may bypass first and second external lips 160, 166 and dynamic protrusion 196. Also, inboardly-extending protrusion 206 and outboardly-extending protrusion 176 cooperate to form obstructed path 208, which makes it difficult for a contaminant that may bypass first lip 160, second lip 166, dynamic protrusion 196, dam 202, and labyrinth 174, to traverse. First and second internal lips 212, 214, respectively, provide additional barriers within main seal 120 to prevent contaminants from entering bearings 18, 20 and cavity 24. Finally, dynamic sealing lip 218 rides against axially-extending inward wall 134 to form a primary seal against the ingress of contaminants and to retain lubricant in wheel end assembly 16.

Main seal 120 also features a dynamic expulsion surface to prevent contaminants from moving past the seal. In the event that a contaminant makes it past first lip 160, second lip 166, dynamic protrusion 196, dam 202, labyrinth 174, and obstructed path 208, features of main seal 120 form the dynamic expulsion surface, which includes capillary surface L and transmission or pumping surface P. Capillary surface L is formed by the close-proximity features of obstructed path 208, labyrinth 174, dam 202, external channel 198, and hub bore 162 in relation to second external lip 166, external channel 168, and first external lip 160, and is a thin capillary area that has a radial section which traps contaminants, and during vehicle operation, dynamically moves or pushes contaminates radially outwardly away from wheel end assembly 16. Pumping surface P includes a configuration formed by first and second internal lips 212, 214 that transmits or pumps contaminants radially outwardly toward capillary surface L during vehicle operation.

Main seal 120 also includes minimal drag in order to preserve the life of the seal and optimize vehicle fuel efficiency. For example, many exclusion features of seal 120 are non-contact features and thus do not induce drag. Such non-contact features in main seal 120 include first external lip 160, second external lip 166, dynamic protrusion 196, labyrinth 174, inboardly-extending protrusion 206 and outboardly-extending protrusion 176, and second internal lip 214. In addition, contact features in main seal 120 are configured to impart minimal drag. For example, dam 202 includes minimal contact surface area, first internal lip 212 contacts radially-extending wall 128 only lightly, and sealing lip 218 is preferably formed of a low coefficient of friction material.

Preferably, a light preload on bearings 18, 20 is employed as known in the art, which limits axial movement of hub 32 during vehicle operation. Limiting axial movement of hub 32 optimizes the performance of capillary surface L, as described above, and provides an additional feature of main seal 120. More particularly, limiting axial movement of hub 32 limits axial movement of components of main seal 120 relative to one another, which desirably reduces any adverse pumping action within the seal, that is, pumping action that may encourage contaminants to pass through the exclusion features of the seal.

The present invention also includes a method for preventing contaminants from entering a heavy-duty vehicle wheel end assembly employing a main seal that includes an enhanced combination of external features and internal features that optimize the prevention of contaminants from entering the wheel end assembly and retain lubricant in the wheel end assembly, and provide a dynamic expulsion surface to expel contaminants, while including minimal drag in order to preserve the life of the seal and optimize fuel efficiency. The method includes steps in accordance with the description that is presented above and shown in FIGS. 3 and 4.

It is to be understood that the structure of the above-described main or hub seal for a heavy-duty vehicle wheel end assembly of the present invention may be altered or rearranged, or certain components and/or features omitted or added, without affecting the overall concept or operation of the invention. For example, while main seal 120 is shown and described as a hub-mounted seal, the aforementioned aspects of the invention may be applied to a spindle-mounted seal, without affecting the overall concept or operation of the invention. In addition, main seal 120 may be formed with configurations, dimensions, shapes, and/or features, and of materials, other than those shown and described above, without affecting the overall concept or operation of the invention. It is also to be understood that the present invention finds application in all types of heavy-duty wheel end assemblies known to those skilled in the art, including other types of wheel end assemblies than those shown and described herein and known to those skilled in the art, without affecting the concept or operation of the invention.

Accordingly, the improved main seal for a heavy-duty vehicle wheel end assembly is simplified, provides an effective, safe, inexpensive, and efficient structure which achieves all the enumerated objectives, provides for eliminating difficulties encountered with prior art main seals, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to an exemplary embodiment. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved main seal for a heavy-duty vehicle wheel end assembly is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A main seal for a heavy-duty vehicle wheel end assembly, said wheel end assembly including an axle spindle and a hub rotatably mounted on said axle spindle, said main seal extending radially between the axle spindle and said hub, said main seal comprising:
   a dynamic portion seating in a bore formed in said wheel hub; and
   a static portion seating on said axle spindle, said static portion including:
      a rigid carrier having a generally C-shaped first carrier member with a radially-extending wall and an axially-extending outward wall; and an elastomer bonded to said first carrier member to encapsulate a radial inward surface, a radial outward surface and an outboard end surface of the axially-extending outward wall, said elastomer forming a first external lip extending from the axially-extending outward wall, said first external lip being spaced completely apart from a chamfer formed in an inboard end of said hub, whereby the first external lip is free of contact with any structure, said elastomer bonded to said carrier also forming a second external lip extending from the axially-extending outward wall and adjacent said first external lip whereby the second external lip is also free of contact with any structure.

2. The main seal for a heavy-duty vehicle wheel end assembly of claim 1, wherein said hub chamfer is formed at an angle of about thirty degrees from a longitudinal centerline of said axle spindle.

3. The main seal for a heavy-duty vehicle wheel end assembly of claim 1, wherein said second external lip is located outboard of said first external lip and said first and second external lips create a capillary sealing element with said hub.

4. The main seal for a heavy-duty vehicle wheel end assembly of claim 3, wherein said elastomer bonded to said carrier forms a channel between said first and second external lips, said channel urging contaminants, which pass by the first external lip, inboardly away from said main seal.

5. The main seal for a heavy-duty vehicle wheel end assembly of claim 1, wherein said carrier includes a second member that is rigidly attached to an axially-extending inward wall of said first carrier member and is generally L-shaped.

6. The main seal for a heavy-duty vehicle wheel end assembly of claim 1, wherein said elastomer bonded to said carrier forms an outboard portion that includes spaced-apart, annularly-arranged protrusions.

7. The main seal for a heavy-duty vehicle wheel end assembly of claim 1, wherein said dynamic portion includes a rigid carrier and an elastomer bonded to said dynamic portion carrier.

8. The main seal for a heavy-duty vehicle wheel end assembly of claim 7, further comprising a sealing lip attached to said elastomer bonded to said dynamic portion carrier.

9. The main seal for a heavy-duty vehicle wheel end assembly of claim 8, wherein said sealing lip is formed of a polymer that includes a low coefficient of friction.

10. The main seal for a heavy-duty vehicle wheel end assembly of claim 8, wherein said sealing lip is formed with features.

11. The main seal for a heavy-duty vehicle wheel end assembly of claim 1, wherein said static portion and said dynamic portion cooperate to form an external channel.

12. The main seal for a heavy-duty vehicle wheel end assembly of claim 1, wherein said dynamic portion includes a carrier, and said elastomer bonded to said carrier of said static portion forms an outboard portion that includes spaced-apart, annularly-arranged protrusions that contact a wall section of said dynamic portion carrier to form a dam.

13. The main seal for a heavy-duty vehicle wheel end assembly of claim 1, wherein said static portion and said dynamic portion cooperate to form an internal labyrinth.

14. The main seal for a heavy-duty vehicle wheel end assembly of claim 7, wherein said elastomer bonded to said dynamic portion carrier forms a first internal lip that contacts said carrier of said static portion.

15. The main seal for a heavy-duty vehicle wheel end assembly of claim 14, wherein said elastomer bonded to said dynamic portion carrier forms a second internal lip radially inwardly of said first internal lip.

16. The main seal for a heavy-duty vehicle wheel end assembly of claim 7, wherein said elastomer bonded to said dynamic portion carrier forms a first internal lip, and said seal includes a dynamic expulsion surface, which includes a capillary surface that extends radially inwardly from a point on said hub chamfer adjacent a radially outward and axially inboard point of said first external lip to an area of contact of said first internal lip with a radial wall of said static portion carrier.

17. The main seal for a heavy-duty vehicle wheel end assembly of claim 16, wherein a ratio of a length of said capillary surface to a radial seal height is greater than about 1.20.

18. The main seal for a heavy-duty vehicle wheel end assembly of claim 17, wherein said ratio of a length of said capillary surface to a radial seal height is about 1.46.

19. The main seal for a heavy-duty vehicle wheel end assembly of claim 16, wherein said seal includes at least twelve bends that are between zero and ninety degrees between said point on said hub chamfer adjacent a radially outward and axially inboard point of said first external lip and said an area of contact of said first internal lip with a radial wall of said static portion carrier.

20. The main seal for a heavy-duty vehicle wheel end assembly of claim 19, wherein said seal includes about sixteen bends that are between zero and ninety degrees between said point on said hub chamfer adjacent a radially outward and axially inboard point of said first external lip and said an area of contact of said first internal lip with a radial wall of said static portion carrier.

21. The main seal for a heavy-duty vehicle wheel end assembly of claim 16, wherein said elastomer bonded to said dynamic portion carrier forms a second internal lip radially inwardly of said first internal lip, and said capillary surface cooperates with a transmission surface that extends from a radially inward and axially inboard point of said second internal lip radially outwardly to said area of contact of said first internal lip with said radial wall of said static portion carrier.

22. The main seal for a heavy-duty vehicle wheel end assembly of claim 21, wherein a ratio of a length of said capillary surface and said transmission surface to a radial seal height is greater than about 1.50.

23. The main seal for a heavy-duty vehicle wheel end assembly of claim 22, wherein said ratio of a ratio of a length of said capillary surface and said transmission surface to a radial seal height is about 1.93.

24. The main seal for a heavy-duty vehicle wheel end assembly of claim 21, wherein a ratio of a length of said capillary surface and said transmission surface to an envelope distance of said main seal is greater than about 1.20.

25. The main seal for a heavy-duty vehicle wheel end assembly of claim 24, wherein said ratio of a ratio of a length of said capillary surface and said transmission surface to said envelope distance is about 1.58.

26. A main seal for a heavy-duty vehicle wheel end assembly, said wheel end assembly including an axle spindle and a hub rotatably mounted on said axle spindle, said main seal extending radially between the axle spindle and said hub, said main seal comprising:
   a dynamic portion seating in a bore formed in said wheel hub; and a static portion seating on said axle spindle, said static portion including:
  a rigid carrier having a generally C-shaped first carrier member with a radially-extending wall and an axially-extending outward wall; and
  an elastomer bonded to said first carrier member to encapsulate a radial inward surface, a radial outward surface and an outboard end surface of the axially-extending outward wall, said elastomer forming a first external lip extending from the axially-extending outward wall, said first external lip being spaced completely apart from a chamfer formed in an inboard end of said hub, whereby the first external lip is free of contact with any structure, said elastomer bonded to said carrier also forming a second external lip extending from the axially-extending outward wall and adjacent said first external lip whereby the second external lip is also free of contact with any structure, said elastomer forming a series of spaced-apart, outboard-extending bumpers for cooperating with dynamic seal portion.

27. The main seal of claim 26 wherein the bumpers extend in a direction axially outboard from said outboard end surface of said axially-extending outward wall.

28. A main seal for a heavy-duty vehicle wheel end assembly, said wheel end assembly including an axle spindle and a hub rotatably mounted on said axle spindle, said main seal extending radially between the axle spindle and said hub, said main seal comprising:
  a dynamic portion seating in a bore formed in said wheel hub; and
  a static portion seating on said axle spindle, said static portion including:
    a rigid carrier having a generally C-shaped first carrier member with a radially-extending wall and an axially-extending outward wall; and
    an elastomer bonded to said first carrier member to encapsulate a radial inward surface, a radial outward surface and an outboard end surface of the axially-extending outward wall, said elastomer forming a first external lip extending from the axially-extending outward wall, said first external lip being spaced completely apart from a chamfer formed in an inboard end of said hub, whereby the first external lip is free of contact with any structure, said elastomer bonded to said carrier also forming a second external lip extending from the axially-extending outward wall and adjacent said first external lip whereby the second external lip is also free of contact with any structure, said elastomer forming an outboard-extending dam for cooperating with dynamic seal portion.

29. The main seal of claim 28 wherein the dam is integrally formed with said elastomer and extends in a direction axially outboard from said outboard end surface of said axially-extending outward wall.

30. The main seal of claim 28 further including bumpers and a wall section of the dynamic portion cooperating to form the dam.

31. A main seal for a heavy-duty vehicle wheel end assembly, said wheel end assembly including an axle spindle and a hub rotatably mounted on said axle spindle, said main seal extending radially between the axle spindle and said hub, said main seal comprising:
  a dynamic portion seating in a bore formed in said wheel hub; and
  a static portion seating on said axle spindle, said static portion including:
    a rigid carrier having a generally C-shaped first carrier member with a radially-extending wall and an axially-extending outward wall; and
    an elastomer bonded to said first carrier member to encapsulate at least a portion of the axially-extending outward wall, said elastomer forming a first external lip extending from the axially-extending outward wall, said first external lip being spaced from a chamfer formed in an inboard end of said hub, whereby the first external lip is free of contact with any structure, said elastomer bonded to said carrier also forming a second external lip extending from the axially-extending outward wall and adjacent said first external lip and spaced from said hub whereby the second external lip is also free of contact with any structure, wherein the elastomer, the first lip and the second lip cooperate with the hub, chamfer, and said dynamic portion to provide capillary action.

32. The main seal of claim 31 further including a dam formed by said elastomer and extending in a direction axially outboard from said outboard end surface of said axially-extending outward wall.

* * * * *